US006401027B1

(12) United States Patent
Xu et al.

(10) Patent No.: US 6,401,027 B1
(45) Date of Patent: Jun. 4, 2002

(54) REMOTE ROAD TRAFFIC DATA COLLECTION AND INTELLIGENT VEHICLE HIGHWAY SYSTEM

(75) Inventors: Yiwen Xu; Youchun Jin, both of Nepean (CA)

(73) Assignee: Wenking Corp., St. Lambert (CA)

( * ) Notice: Subject to any disclaimer, the term of this patent is extended or adjusted under 35 U.S.C. 154(b) by 0 days.

(21) Appl. No.: 09/317,127

(22) Filed: May 24, 1999

(30) Foreign Application Priority Data

Mar. 19, 1999 (CA) ........................................... 2266208

(51) Int. Cl.[7] .................... G06F 163/00; G06F 165/00; G08G 1/09

(52) U.S. Cl. ....................... 701/117; 701/207; 701/208; 340/988

(58) Field of Search ................................ 701/117, 209, 701/201, 200, 207, 208, 212, 214, 118, 119; 340/988, 990, 995, 905

(56) References Cited

U.S. PATENT DOCUMENTS 4,792,803 A * 12/1988 Madnick et al. ............ 340/905
5,132,684 A * 7/1992 Pecker et al. ............... 340/905
5,164,904 A * 11/1992 Sumner ...................... 364/436
5,347,456 A 9/1994 Zhang et al. .......... 364/424.02
5,396,429 A * 3/1995 Hanchett .................... 364/436
5,504,482 A 4/1996 Schreder ..................... 340/995
5,506,587 A * 4/1996 Lans .......................... 342/357
5,539,645 A * 7/1996 Mandhyan et al. ......... 364/438
5,546,188 A 8/1996 Wangler et al. ............. 356/376
5,610,821 A * 3/1997 Gazis et al. ............ 364/444.2
5,635,924 A * 6/1997 Tran et al. .................. 340/905
5,801,943 A * 9/1998 Nasburg ..................... 364/436
5,812,069 A * 9/1998 Albrecht et al. ............ 340/905
5,822,712 A * 10/1998 Olsson ....................... 701/117
5,835,881 A 11/1998 Trovato et al. ............. 701/211
5,862,510 A * 1/1999 Saga et al. .................. 701/211
5,889,477 A * 3/1999 Fastenrath .................. 340/905
5,908,464 A * 6/1999 Kishigami et al. .......... 701/208
6,023,655 A * 2/2000 Nomura ...................... 701/208
6,047,234 A * 4/2000 Cherveny et al. ........... 701/200
6,072,409 A * 6/2000 Fushimi et al. ............. 340/988
6,098,015 A * 8/2000 Nimura et al. .............. 701/209

* cited by examiner

*Primary Examiner*—Tan Nguyen
*Assistant Examiner*—Dalena Tran
(74) *Attorney, Agent, or Firm*—Wayne M. Yan; Max R. Wood

(57) ABSTRACT

A remote traffic data acquisition and intelligent vehicle highway system for highway vehicles is provided. In-vehicle devices compute time-related vehicle locations on a digitized road network map using information received from a global position system (GPS) and transmit the time-related vehicle locations to a traffic service center. The traffic service center collects the data from all equipped vehicles that travel the roadway system in an area within range, processes the data and provide a real-time traffic forecasts. The in-vehicle devices receive the digitized road network map as well as the real-time traffic forecasts and provide route guidance and related services for the drivers using the traffic forecast information. The traffic forecast is based on projections from normal traffic conditions retrieved from archived data adjusted by factors related to real-time situations. The system provides a practical and economic solution for an intelligent highway vehicle system.

33 Claims, 6 Drawing Sheets

REMOTE ROAD TRAFFIC DATA COLLECTION AND INTELLIGENT VEHICLE HIGHWAY SYSTEM

TECHNICAL FIELD

This invention relates to traffic data collection and intelligent routing systems for highway vehicles and, in particular, to a system and method for remotely collecting real-time traffic data and providing traffic forecasts and travel guidance for drivers of vehicles equipped to utilize the system.

BACKGROUND OF THE INVENTION

Modern automobile travel is plagued by excessive traffic congestion due to continuously increasing automobile use. Drivers constantly seek optimum travel routes to minimize driving time. Local area radio and television stations transmit traffic alerts to inform drivers of blocked or congested traffic routes so that drivers familiar with alternate routes to their respective destinations can alter their planned route to minimize driving time. This, however, is often unproductive and results in increased travel time. Such traffic alerts disadvantageously require real-time reception by drivers prior to entering a congested traffic area. Traffic alerts are often missed because drivers are not tuned to the right station at the proper time. Besides, drivers tend to learn and routinely follow the same route day after day without becoming familiar with alternate routes even when they encounter heavy recurring congestion.

Roadside signs are also used to warn drivers and re-direct traffic during road construction or traffic congestion. For example, detour signs and electronic roadside billboards are used to suggest or require alternate routes. Some electronic billboards are located on main traffic arteries, warning of a pending traffic blockage or congestion. However, signs and billboards are usually too near the point of congestion or blockage to enable meaningful re-evaluation of a planned route, primarily because of the required close proximal relationship between the location of the sign and the point of congestion or blockage. There exists a continuing need to improve the collection of accurate traffic congestion data in order to provide accurate route planning information.

Governmental agencies provide emergency care service in response to roadside vehicle accidents, as is well known. Governmental agencies in North America have adopted the well-known "911" emergency call system through which road accidents are reported to enable emergency care services including police, fire and paramedic services to respond. The 911 emergency system relies on the reporting of accidents by private citizens who are typically either witnesses to an accident or are involved in the accident. However, when victims are incapacitated by injury, or when witnesses are unable to quickly locate a telephone, the 911 system fails. Moreover, critical time is often lost while searching for a telephone to place the 911 call. In addition, misinformation may be inadvertently given by victims or witnesses unfamiliar with the location of an accident, thereby directing the emergency care providers to a wrong location. There therefore exists a need for a system to more expeditiously provide accurate vehicle traffic accident information to emergency care providers.

Automobiles have also been equipped with experimental local area road-map systems which display a portion of a map of interest but do not use a global positioning system (GPS) to determine a vehicle position on the map. The driver is enabled to locate departure and destination points on the map, and then visually refers to the displayed map to see the current position of the vehicle as the driver travels toward the destination point. The map system displays a cursor to indicate the current position of a moving vehicle on the display map. The portion of the map that is displayed is periodically adjusted to keep the current position cursor in the center of the displayed map. The system uses a compass and a wheel sensor odometer to determine the current position as the vehicle travels on the road. The use of this map display system requires the driver to repetitively study the map and then mentally determine and select travel routes, directing attention away from the safe operation of the vehicle. This does not promote safe vehicle operation. Besides, the compass and wheel odometer technology causes map position error drifts, requiring re-calibration after travelling only a few miles. Moreover, the use of such a map system disadvantageously requires the entry of the departure point each time the driver begins a new route. Additionally, this map system does not perform route guidance and is not dynamically updated with current traffic information. There therefore exists a need to improve map systems with a driver friendly interface which reduces diversion away from the safe operation of the vehicle.

Certain experimental integrated dynamic vehicle guidance systems have been proposed. For example, Motorola has disclosed an intelligent vehicle highway system in block diagram form in a 1993 brochure, and DELCO Electronics has disclosed another intelligent vehicle highway system, also in block diagram form, in Automotive News published on Apr. 12, 1993. These systems use compass technology for vehicle positioning. However, displacement wheel sensors are plagued by tire slippage, tire wear and are relatively inaccurate, requiring re-calibration of a current vehicle position. Compasses suffer from drift, particularly when driving on a straight road for an extended period of time. These intelligent vehicle highway systems appear to use GPS satellite reception to enhance vehicle tracking on road-maps as part of a guidance and control system. GPS data is used to determine when drift errors become excessive and to indicate that re-calibration is necessary. However, the GPS data is not used for automatic re-calibration of a current vehicle position. These intelligent vehicle highway systems also use RF receivers to receive dynamic road condition information for dynamic route guidance, and contemplate infrastructure traffic monitoring, for example, a network of road magnetic sensing loops, and contemplate the RF broadcasting of dynamic traffic conditions for route guidance. The disclosed two-way RF communication through the use of a transceiver suggests a dedicated two-way RF radio data system. While two-way RF communication is possible, the flow of information between the vehicles and central systems appears to be exceedingly lopsided. It appears that the amount of the broadcast dynamic traffic flow information from a central traffic radio data control system to the vehicles would be far greater than the information transmitted from the vehicles to the central traffic control center, since the system is only used to report roadside incidents or accident emergency messages to the control center.

To overcome the above disadvantages, U.S. Pat. No. 5,504,482 entitled AUTOMOBILE NAVIGATION GUIDANCE, CONTROL AND SAFETY SYSTEM, which issued to K. D. Schreder on Apr. 2, 1996, discloses an automobile route guidance system. In this system, an automobile is equipped with an inertial measuring unit and GPS satellite navigational unit and a local area digitized street map system for precise electronic positioning and route guidance between departures and arrivals. The system is equipped with RF receivers to monitor updated traffic condition information for dynamic re-routing guidance to reduce travel time. It is also equipped with vehicle superseding controls activated during unstable vehicle conditions sensed by the inertial measuring unit to improve the safe operation of the automobile. Telecommunications equipment automatically notifies emergency care providers of the precise location of the automobile in the case of an accident so as to improve the response time of roadside emergency care providers.

Nevertheless, Schreder fails to address how the traffic data is collected for broadcasting road traffic conditions on which the system relies to provide the navigational guidance. A map-matching smoothing process disclosed by Schreder is also not optimal because it adjusts the display output so that a vehicle is displayed on a road rather than elsewhere on the map when navigation positioning errors occur. The process does the adjustment in a manner in which the cursor representing the current position of the vehicle is simply moved to the nearest available road position on the map. This may position the vehicle on a wrong road, particularly if more than one road is about equally near the cursor.

There are several known methods for collecting traffic data. In the most common, different sensing systems are used to collect traffic volume and vehicle speed. Sensors for counting purposes are installed along highways to measure traffic volume. Video cameras, color machine vision technology and pulsed laser range imaging technology are used to generate advanced traffic parameters such as driving speed and travel time. These technologies are disclosed, for example, in U.S. Pat. No. 5,546,188 entitled INTELLIGENT VEHICLE HIGHWAY SYSTEM SENSOR AND METHOD, which issued to Wangler et al. on Aug. 13, 1996. In other applications, multifunctional roadway reference systems are suggested, in which discrete marks installed in the center of a traffic lane code one or more bits of information, such as geographical position, upcoming road geometry and the like. An example of roadway reference systems is disclosed in U.S. Pat. No. 5,347,456 which is entitled INTELLIGENT ROADWAY REFERENCE SYSTEM FOR VEHICLE LATERAL GUIDANCE AND CONTROL. This patent issued to Zhang et al. on Sep. 13, 1994.

Given the size of a continental highway system, using sensors and/or cameras to collect road traffic data for each and every public road on the continent is impractical. Considering the technical considerations and the system costs, a method for collecting dynamic traffic data using equipment installed in vehicles is required. Furthermore, the prior art does not teach a general road network traffic forecast system for broadcasting road traffic forecasts to enable drivers to plan a trip in advance. There exists a need for improved remote road traffic data collection and traffic forecast system.

SUMMARY OF THE INVENTION

An object of the invention is to provide a remote traffic data collection and intelligent vehicle route planning system.

Another object of the invention is to provide a road network traffic forecasting system.

Yet another object of the invention is to provide drivers of automobiles with a route planning system.

Yet another object of the invention is to provide a route planning system which uses GPS information to accurately position a vehicle within a digitized road network.

Still another object of the invention is to provide a route planning system which computes optimal routes between a departure and a destination point based on road traffic forecasts and current road condition information.

A further object of the invention is to provide an economical system for remote collection of road traffic data from a wide area to enable road traffic forecasts.

Yet a further object of the invention is to provide a system which disseminates road traffic forecast information to travelling vehicles and collects road traffic data at a traffic service center.

In general terms, a remote traffic data collection and intelligent vehicle highway system comprises a road traffic data collection sub-system, a communication sub-system, a traffic service center that stores and processes road traffic information and provides real-time road traffic forecasts for drivers, and a route guidance sub-system. The road traffic data collection sub-system and the route guidance sub-system are incorporated in in-vehicle equipment. The road traffic data collection sub-system uses global positioning information received from a global position system (GPS) by the in-vehicle equipment which uses the information to compute a position of the vehicle on a digitized road network. The digitized road network includes nodes substantially representing road-intersections, and straight links representing road segments and indicating traffic directions between the nodes. A radio-frequency communication system transmits the vehicle position data to the traffic service center which processes the data for use in the road traffic forecasts. The vehicle position data transmitted includes only data related to the nodes. The road traffic forecasts are based on data collected over a period of weeks. The road traffic data collected at a given time on a given day of a week for a specific road segment is processed so that an average travel time or speed for the road segment at the given time on the given day of the week is determined and is used to forecast the travel time or speed in normal road conditions for the road segment at the same time on the same day in the future.

Road traffic speed and volume varies with time of day and day of week. However, under normal conditions that are not affected by an abnormal situation, such as a traffic accident, road construction, bad weather, holidays or public activities, the traffic speed and volume for one day of a week is similar to that of the same day of other weeks. This fact provides a basis for road traffic forecasting under normal conditions. The road traffic forecasting is improved if factors associated with specific abnormal conditions that occur at a time a forecast is made are used to adjust projected travel times.

A method of accurately locating a vehicle on a digitized road network that is formed of nodes and links between the nodes is also described. The method includes the steps of obtaining a geographical position of a vehicle and moving the geographical position to a nearest link in accordance with information associated with a node which the vehicle last passed, in order to avoid locating the vehicle on a wrong link on the digitized road network.

In specific terms, in accordance with one aspect of the invention, there is provided a method for forecasting road traffic comprising the steps of:

(a) periodically collecting vehicle position data at a traffic service center, the vehicle position data being dynamically reported by equipped vehicles travelling roads in a given area, the equipped vehicles being adapted to receive geographical position data into relative vehicle position data to determine a position of the vehicle with respect to a digitized road network of nodes interconnected by straight links, the links indicating traffic directions between the nodes, the vehicle position data reported including only data related to the nodes, the geographical position data being received and converted into a relative position on the digitized road network at a predetermined collection interval (CI) and the vehicle position data being reported at a predetermined reporting interval (RI), wherein RI>CI;

(b) computing real travel time of vehicles travelling the links using the vehicle position data;

(c) determining a set of real travel time samples for a link L i from actual travel times of vehicles that travelled the link during a given time interval starting at or including a time t on a given day D of a week; and (d) calculating an average travel time T1 for the link L1 using the set of travel time samples at a time t on the day D, and storing the average travel time T1 for use in predicting a travel time for the link L1.

Preferably, the method further comprises steps of repeating steps of (c) and (d) to calculate an average travel time T2 for a link L2 at a time (t+T1), an average travel time T3 for a link L3 at a time (t+T1+T2), up to an average travel time Tn for a link Ln at a time (t+T1+T2+. . . +Tn−1); calculating an average travel time $T_R$ of a route R including continuous links L1, L2, L3, . . . and Ln at the departure time t by summing up the average travel times T1, T2, T3, . . . and Tn for predicting a travel time for route R at the departure time t on the day D.

If the route R further includes some critical left-turns where waiting times cannot be ignored, then left-turn time is also added to the travel time for route R in the same way as described above.

In accordance with another aspect of the invention, there is provided a remote traffic data collection and intelligent routing system for highway vehicles, comprising:

a traffic service center adapted to receive and process vehicle position data to determine an average travel time or travel speed for any specific link during a given forecast interval on a given day of the a week, and broadcast a digitized road network consisting of nodes interconnected by straight links representing road segments, the links indicating traffic direction between the nodes, and to concurrently, or independently broadcast a forecast of an average travel time or travel speed for the specific link during the given forecast interval on the given day in the future;

a remote traffic data collection sub-system including in-vehicle devices in a plurality of vehicles, each of the devices being adapted to receive, from time to time, global positioning information from a Global Positioning System (GPS) and to convert the global positioning information into the vehicle position data associated with at least some of the nodes on the digitized road network, the global positioning information being received and converted into the vehicle position data at a predetermined collection interval (CI); and a communication sub-system in each device and the traffic service center for communicating the vehicle position data from the vehicle to the traffic service center, and the digitized load network and the road traffic forecast from the traffic service center to the vehicle, the vehicle position data being reported to the traffic service center at a predetermined reporting interval (RI), wherein RI>CI.

The system provides a practical and economic solution for providing an intelligent vehicle highway system serving a wide area and providing reliable traffic forecasts for vehicles equipped with the system.

BRIEF DESCRIPTION OF THE DRAWINGS

The invention will now be further described by way of example only and with reference to the accompanying drawings, in which.

DETAILED DESCRIPTION OF THE PREFERRED EMBODIMENT

Figure 1:
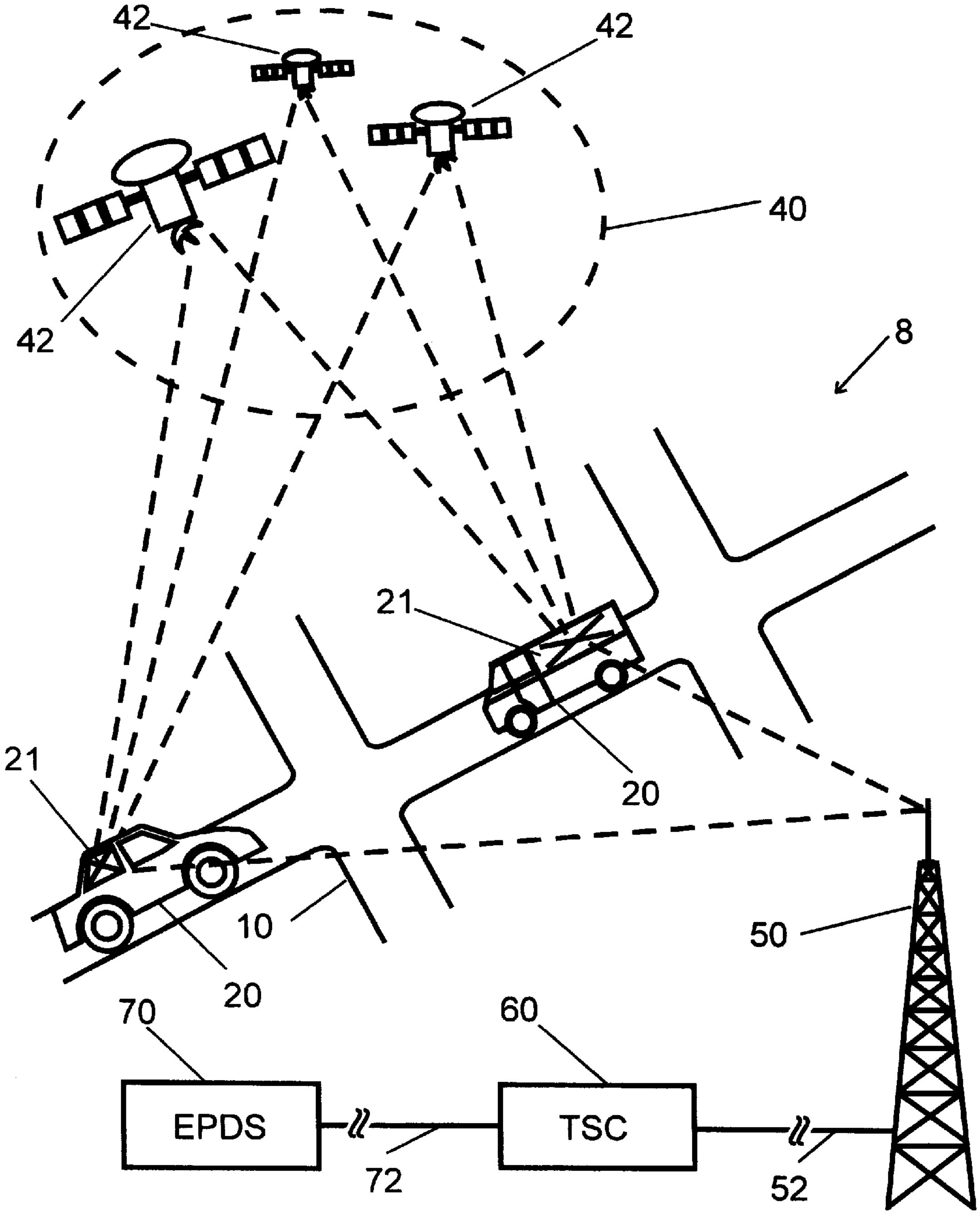
FIG. 1 is a block diagram of a configuration of the preferred embodiment of the invention.

FIG. 1 illustrates a traffic data remote collection and intelligent vehicle highway system, generally indicated by reference numeral 8. A group of vehicles 20 travel a roadway system 10, which may be a metropolitan highway system, a regional highway system, national expressway system or a cross-continent expressway system. Each vehicle 20 is equipped with an in-vehicle device 21 which receives global positioning information data from satellites 42 of Global Positioning System (GPS) 40. The in-vehicle device 21 converts the GPS information into respective static positions of the vehicle relative to a digitized road network map that represents the roadway system on which the vehicle is travelling. The digitized road network map includes a reference system (latitude and longitude) consistent with the reference system used by the GPS 40. The in-vehicle device 21 transmits the static road positions of the vehicle as radio frequency data to a communication station 50 and the communication station 50 in turn transfers the static vehicle positions through a transfer medium 52 to a traffic service center 60. The traffic service center 60 is also connected to External Party Data Sources (EPDS) 70 which may include information departments of law enforcement agencies, 911 service centers and government agencies such as weather departments, highway and traffic administration departments, etc. The traffic service center 60 uses the road positions of all vehicles 20 and the information obtained from the external party data sources to provide real-time road traffic conditions for the roadway system 10 and broadcasts the traffic conditions via the communication station 50. The in-vehicle device 21 on each vehicle 20 receives the traffic conditions from traffic service center 60 and processes information included in the traffic condition broadcasts to provide route planning to the driver by recommending real-time optimum travel routes based on real-time or forecast traffic conditions.

Figure 2:
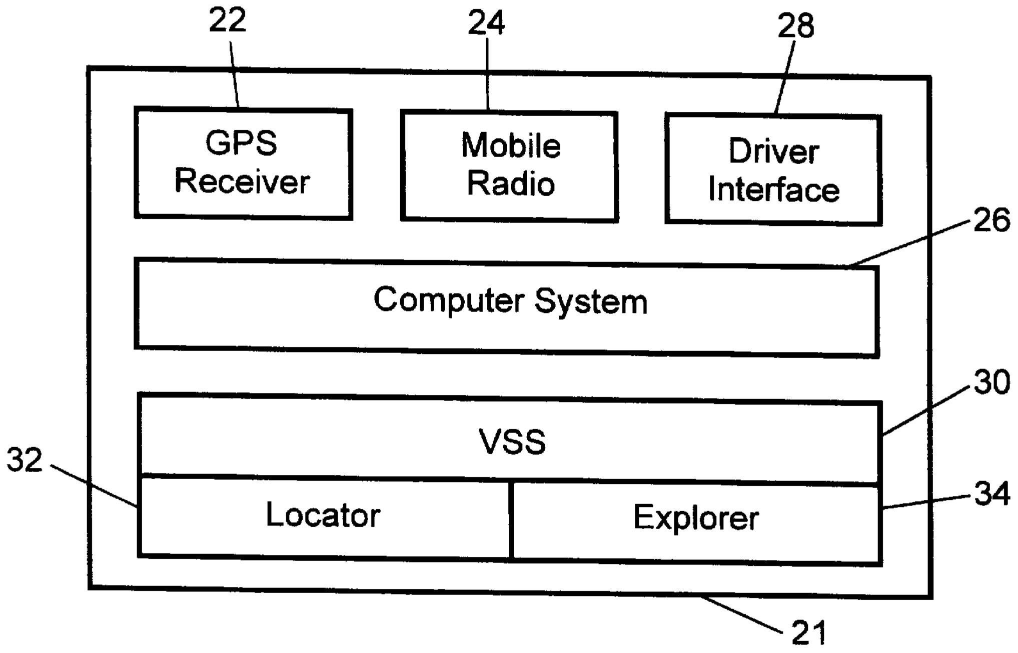
FIG. 2 is a block diagram showing the functional components of an in-vehicle device used in the embodiment of FIG. 1.

The in-vehicle device 21, as illustrated in FIG. 2, includes a GPS receiver 22 that receives GPS information from a constellation of GPS satellites 42 in orbit above the earth.

GPS technology is a vital component of the invention. GPS currently consists of 24 satellites orbiting the earth, each satellite emitting timing positioning signals. The GPS satellites 42 are arranged so that there are always more than three satellites in the field of view of any pertinent place on the earth. The precise position of a point can be determined by measuring the time required for the positioning signals of at least three satellites to reach that point. The GPS satellites 42 transmit global positioning information to the GPS receivers 22 installed in the vehicles 20. Each receiver 22 interprets the signals from three or more satellites 42 and determines a geographical position with an accuracy within an average of 20 meters, which is considered to be a positioning error. Differential GPS systems may provide even greater accuracy using geographic benchmark correction.

The existence of this error means that a geographical position of a vehicle moving on a road derived using the GPS information may appear to be located, for example, in a ditch or even within a roadside building. To correct the vehicle position, a method of converting this geographical position to a location on a corresponding digitized road network map has been developed and will be described below.

A vehicle support sub-system 30 is provided in the in-vehicle device 21. It includes a road network locator 32 (hereinafter locator 32) and a road explorer 34. A mobile radio sub-system 24 is provided for exchanging radio frequency data with the traffic service center 60 via the communication station 50. Also included in the in-vehicle device 21 are a computer system 26 for operating the sub-systems and storing the digitized road network map. A driver interface 28 includes a microphone, data entry pad, screen display and loud-speaker to permit drivers to interact with the in-vehicle device 21.

The locator 32 computes the geographical location of the vehicle, using data received from the GPS receiver 22, and converts it to a position on the digitized road network map, which is broadcast from the traffic service center 60 via the communication station 50 and stored in the computer system 26. From time to time, the mobile radio sub-system 24 transmits vehicle position data processed by the locator 32 to the communication station 50 which forwards road traffic data reported from all vehicles 20 travelling the roadway system 10 to the traffic service center 60 for further processing. The processed data is used for forecasting road traffic conditions. The mobile radio system 24 in the vehicle 20 also receives data broadcast by the communication station 50. The broadcast data includes digitized road network map and traffic forecasts. The data received by the mobile radio sub-system 24 is stored by the computer system 26 and the road network explorer 34 uses the data in conjunction with driver's instructions received from the driver interface 28 to provide intelligent route guidance. The intelligent route guidance, such as an optimum travel route based on real-time traffic conditions, is displayed on the screen display (not shown) of the driver interface 28.

For the purpose of location reports and route guidance, the digital road network map includes only intersections and road segments, each road segment having an indicated traffic direction. The size of a digitized road network map is proportional to the size of the area it represents, densely populated areas having more roads. To map an area, for example, with a population of around one million, a road network of about 10,000 intersections and 40,000 one-way traffic road segments is required. It is assumed that about 20 bytes are required to map each intersection, and each road segment in each traffic direction. Therefore, one megabyte is required to digitize the road network of a metropolitan area of that size. It is not necessary to store a map of the entire continental roadway system in vehicles because metropolitan areas are separated from one another and are connected by the continental expressway system. Digitized road network maps may therefore broadcast on a regional basis and each vehicle keeps only two digitized road network maps at any time. One is the continental expressway network map and the other is a local regional/metropolitan roadway network map. As a vehicle travels from one region to another, it moves away from a previous roadway network using the continental expressway network map. Meanwhile, it receives a new roadway network map of the upcoming region.

The in-vehicle device also includes a means that allows the driver to report an emergency. The driver may simply press an emergency button if an emergency arises. When the emergency button is pressed, the in-vehicle device automatically sends an emergency report to the traffic service center with the vehicle's current position.

Figure 3:
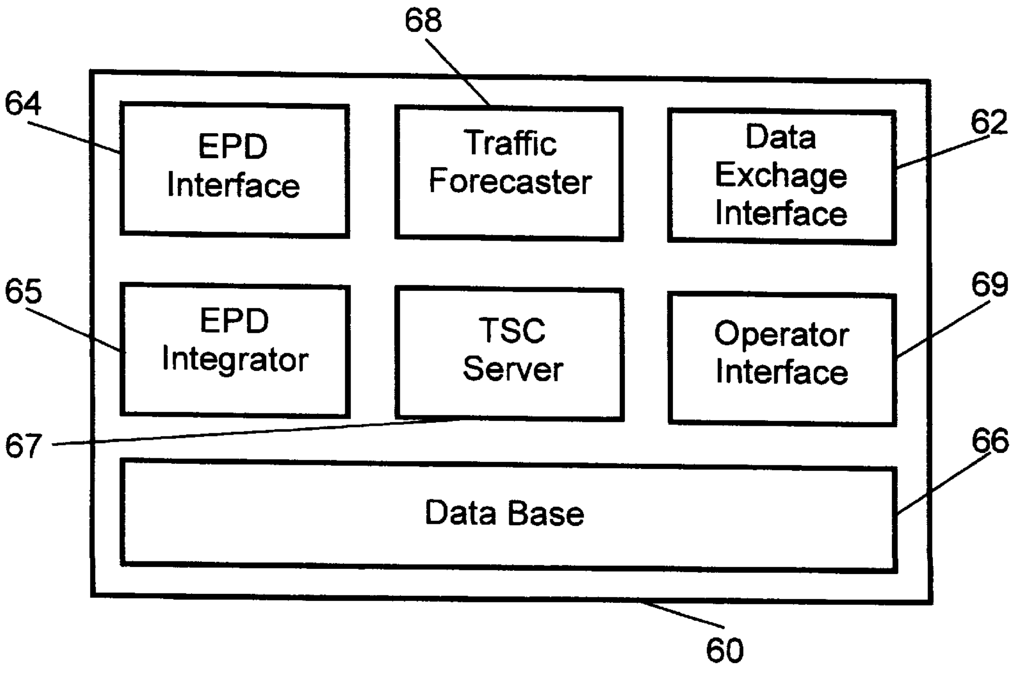
FIG. 3 is a block diagram showing the functional components of a traffic service center in accordance with the invention.

FIG. 3 illustrates the configuration of the traffic service center 60. A data exchange interface 62 is provided for connection of the communication station 50 for receiving the vehicle position data and sending data respecting the digitized road network maps and real-time traffic forecast data which are to be broadcast. An external party interface 64 is provided to connect the external party data sources 70 to receive real-time information about weather or road conditions. The real-time information is processed by an external party data integrator 65 for incorporation into real-time traffic forecasts. The traffic forecasts are computed by a traffic forecaster 68 using the collected vehicle position data for normal road conditions. The collected vehicle position data received from the data exchange interface 62 is stored in a database 66 to be processed by the traffic forecaster 68. A traffic service center (TSC) server 67 is also provided for running the traffic forecaster 68 as well as storing the digitized road network maps and temporarily storing the real-time traffic forecasts. An operator interface 69, including hardware and software for map entry and maintenance, system supervision, etc. permits operators to interact with the system 8.

Figure 4:
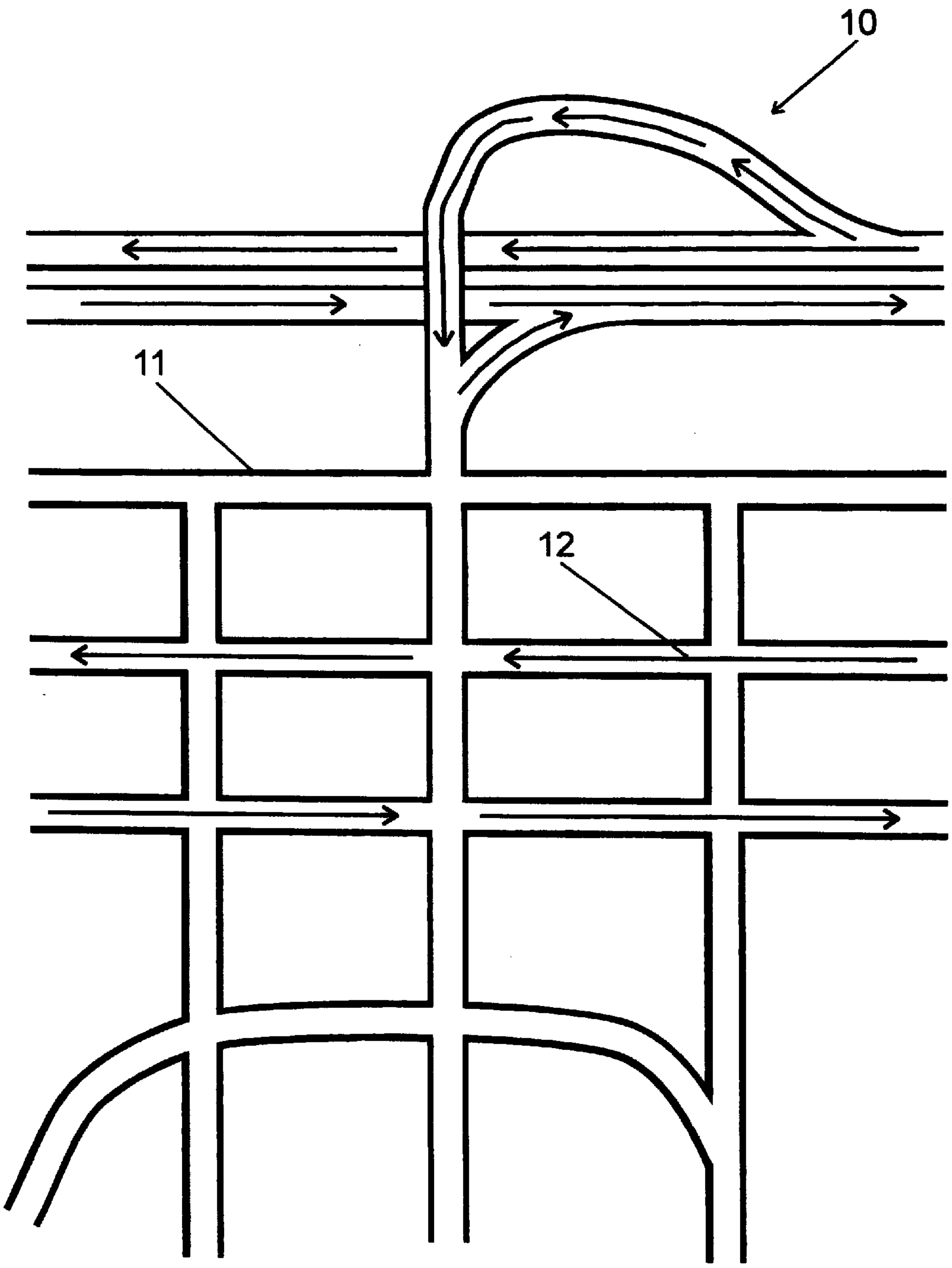
FIG. 4 is a schematic diagram of a roadway system.
Figure 5:
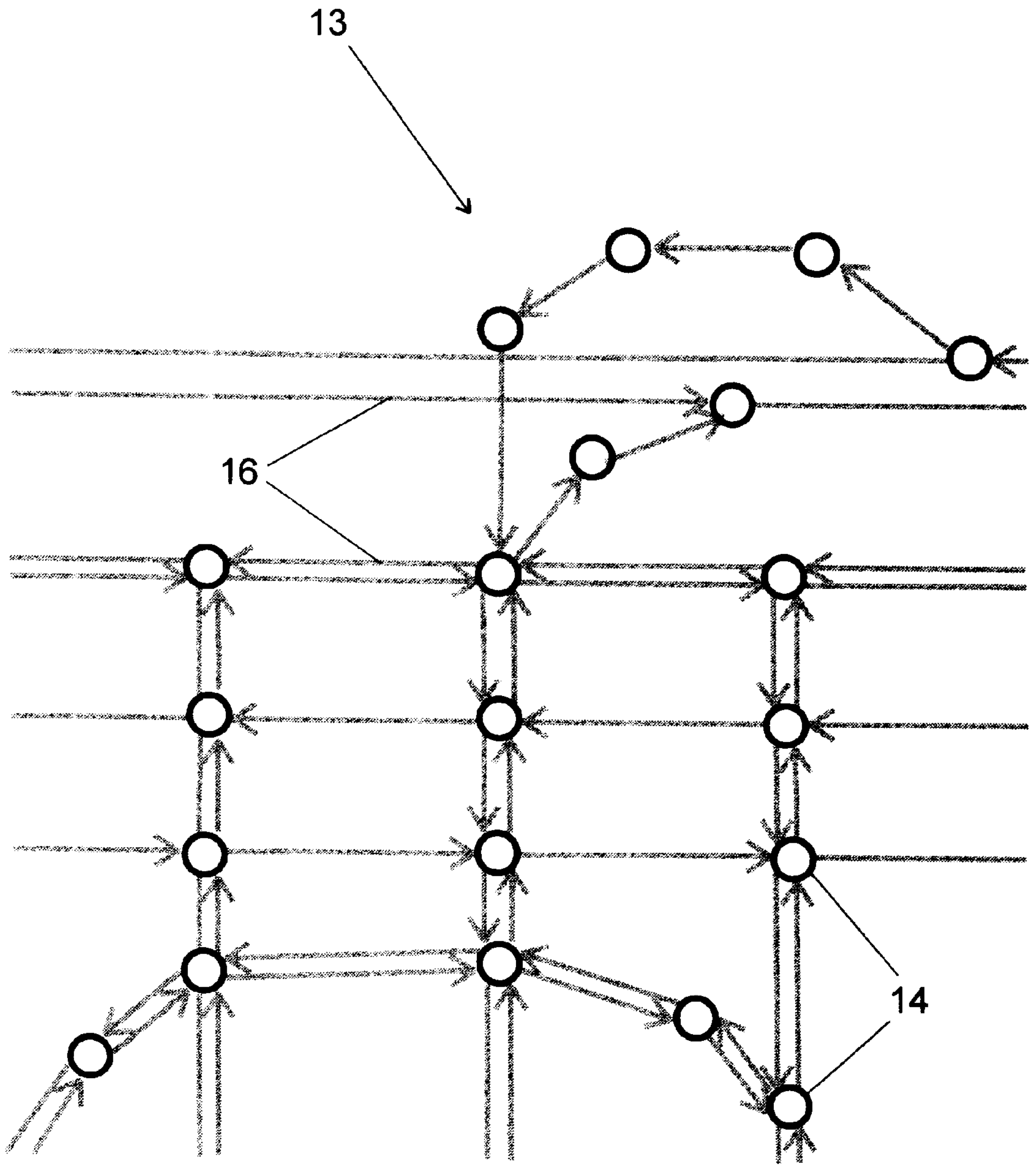
FIG. 5 is a schematic diagram of a digitized road network representing the roadway system shown in FIG. 4.

A roadway system 10 is illustrated in FIG. 4. The roadway system 10 includes a plurality of roads indicated by reference numeral 11. Generally, each road 11 supports two-way traffic, permitting vehicles to travel in opposite directions. Each one-way road, indicated by reference 12, illustrates the traffic direction allowed on the road. As described above, the roadway system 10 is digitized to form a map. The digital map includes only intersections and road segments oriented in the traffic direction in order to maintain a data size appropriate for broadcast and storage by the computer system 26 of an in-vehicle device 21. A digitized road network map 13 representing the roadway system 10 of FIG. 4 is illustrated in FIG. 5. The digitized road network map 13 is an abstract representation of a roadway system which includes intersections, road segments, parking lots, ramps, bridges, overpasses, tunnels, highways and special points. Although there are many physical elements in a roadway system, there are only two classes of elements represented in the digital road network map 13: nodes 14 and links 16 indicating a traffic direction. The node 14 may represent an intersection of two or more roads, an entry to a parking lot, a junction of a highway with an entry or exit ramp, a starting or an endpoint of a bridge, a tunnel, an overpass or an arbitrary location on a road. A link 16 represents a road segment with an orientation indication, which connects two nodes 14 of the road network. A node from which a link originates is called a source node of the link and a node at which a link terminates is called a sink node. Further, the link is said to be an outgoing link of the source node and an incoming link of the sink node.

When a road segment supports only one-way traffic, the road segment may be represented by one link having an orientation that is the same as the traffic direction on the road segment. When a road segment supports two-way traffic, this road segment is represented by two oppositely oriented links.

A road segment may be either straight or curved. In the digitized road network representation, however, all links are straight. Therefore, necessary adjustments are required to make the digitized road network map more meaningful. When a road segment is curved, arbitrary nodes may be inserted to create several shorter straight links. Criteria may be established for determining which curves may be represented as a straight link, and which ones must be segmented into a plurality of straight links. For example, a straight line may be used to represent a curve C if Ls/Lc is sufficiently close to 1, wherein Lc is the length of the curve C and Ls is the length of a straight line connecting end points of the curve C. A predetermined ratio, such as 0.97, for example, may be used. If $0.97<Ls/Lc<1$, the curve C may be represented as one straight link.

Figure 6:
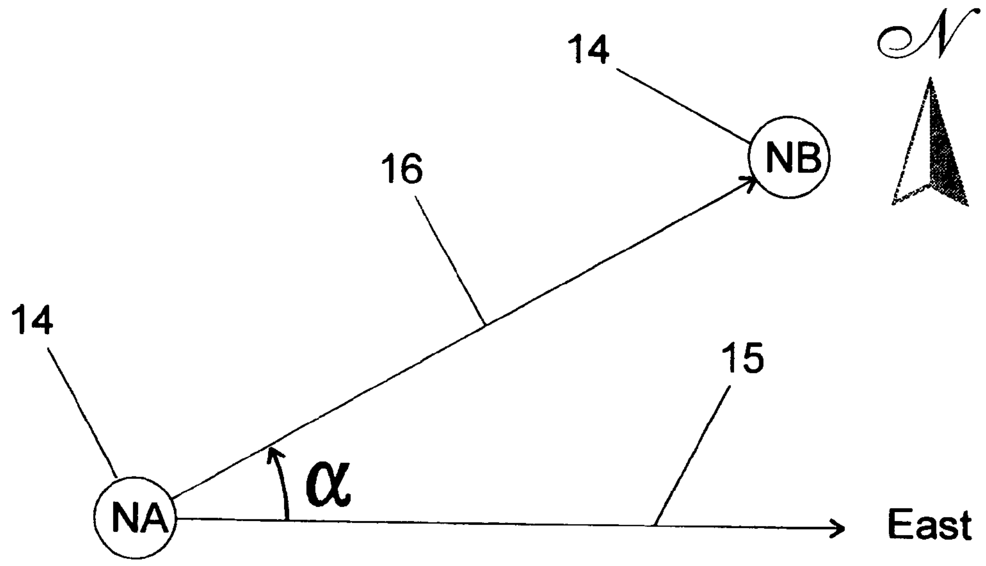
FIG. 6 is a diagram showing a link slope angle.

FIG. 6 illustrates a slope angle, $\alpha$, of each link used in vehicle location calculations. Each link 16 has a source node NA and a sink node NB in the digitized road network map 13. An imaginary link 15 is created in a due east orientation. The slope angle $\alpha$ of the link 16 is determined by computing the angle of rotation between the link 16 and the imaginary link 15. The slope angle $\alpha$ of the link 16 is between 0° and ±180°. It is represented as a positive angle if the link 16 is in an upper quadrant with respect to the imaginary link 15, and as a negative angle if the link 16 is in a lower quadrant with respect to the imaginary link 15. The slope angle of each link provides a basis for correctly locating a vehicle on the digitized road network map 13.

Figure 7:
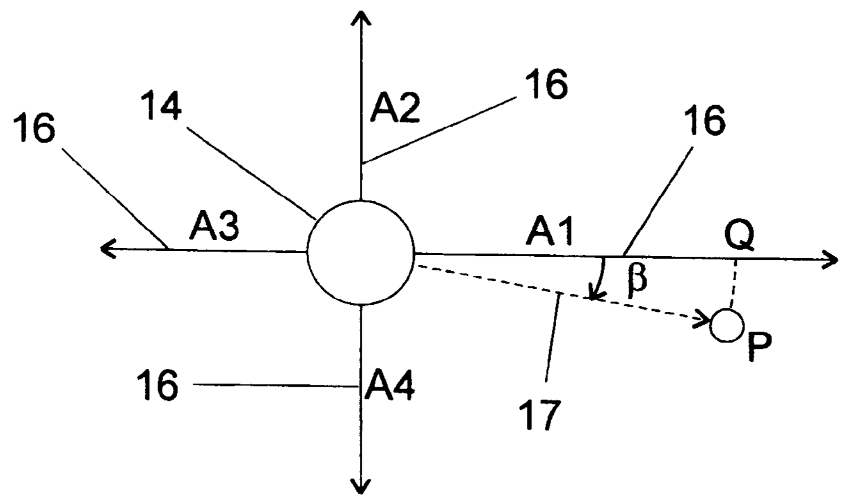
FIG. 7 is a diagram illustrating a method of locating a vehicle position on the digitized road network shown in FIG. 5.

In FIG. 7, node 14 represents an intersection of two roads that are represented by four links 16, A1 to A4. Point P represents a current geographical position derived from GPS information and the node 14 is a last known node that the vehicle passed, as determined from previous steps of the vehicle locating process. An imaginary position link 17 is created from the last known node 14 to the current position P. Slope angles of the position link 17 and each of links A1 to A4 are calculated using the method described above. In this example, the slope angle of a position link 17 is $\beta$, the slope angles of links A1 to A4 are 0°, 90°, 180° and −90°, respectively. One of the links A1 to A4 is selected as a nearest link to the current geographical position P by determining a least difference between an absolute value of the slope angle of each outgoing link and the slope angle of the position link 17. In this case, link A1 is selected as the nearest link. A last step in the method is to move the current geographical position P to point Q on the selected link A1. A distance between node 14 and point Q is equal to the distance between the node 14 and the point P. Using this method, an adjustment of a vehicle position to locate the vehicle on the digitized road network is always associated with information about the last node the vehicle passed, and the probability of locating the position of the vehicle on a wrong road is reduced.

A process for remotely collecting traffic flow speed and travel time using the remote traffic data exchange and intelligent vehicle highway system 8 will now be described.

Each vehicle 20 equipped with a GPS receiver 21 aligned to receive global positioning information from the constellation of satellites 42 uses the GPS positioning information to determine a vehicle's geographical position. If the vehicle is beginning a route, before the geographical position can be located on the digitized road network map 13, a start point for the vehicle's geographical positions has to be determined because the node last passed by the vehicle is required to locate a current geographical position on the digitized road network map 13. The locator 32 places a first geographical position on the digitized road network map and compares a distance between the current geographical position and a nearest node with a predetermined distance. The locator 32 moves the current geographical position to the nearest node and uses that node as the last node passed by the vehicle in the following process steps if the node is less than the predetermined distance from the geographical position. The locator 32 drops the current geographical position if the distance is greater than the predetermined distance, and repeats the process using a next geographical position until the distance between the geographical position and a nearest node is less than the predetermined distance.

Figure 8:
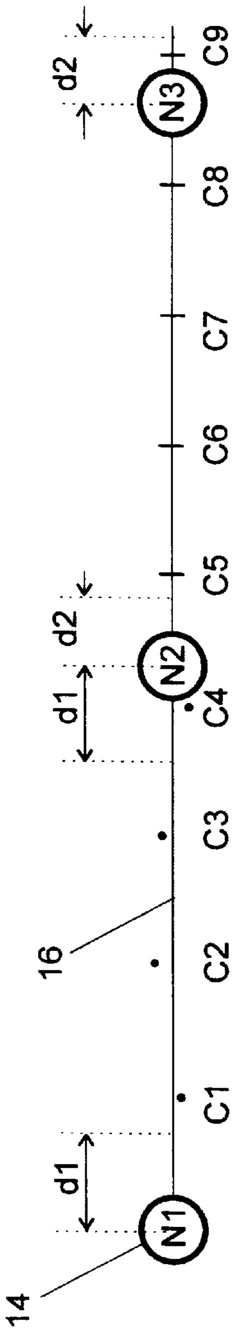
FIG. 8 is a schematic diagram illustrating a method for locating a vehicle position on a node.

The predetermined distance is used to control the accuracy of the positioning process. An example is illustrated in FIG. 8, in which points C1 to C9 on links 16 represent the respective geographical positions related to a time sequence in which the geographical position data was collected. The first geographical position C1 is located a given distance from the nearest node N1 and the given distance is greater than a predetermined distance d1. Therefore, the position C1 is discarded. Similarly, C2 and C3 are discarded. However, the fourth geographical position C4 is within the predetermined distance d1 from a nearest node N2 and position C4 is moved to the node N2, which serves as a start point to be used as a last passed node in further location processing steps. After a last passed node is determined, the road network locator 32 uses the method described above with reference to FIG. 7 to locate the dynamic geographical positions on the links 16 in the digitized road network map 13 if these geographical positions do not coincide with the links 16. As is apparent, the start point is not necessarily located at the beginning of each trip.

It is recommended that in-vehicle devices 21 be powered on to receive traffic forecast data while equipped vehicles are parked. The reason for doing so is to provide drivers with access to current traffic forecast data and the route guidance services as soon as they start a trip, avoiding a delay required for data gathering to assemble information respecting the local roadway system. Besides, in standby mode the in-vehicle device 21 keeps the last passed node data from the previous trip, and this last passed node can generally be used as a start point for a the next trip. There are a few exceptions, however. For example, if a vehicle enters an underground garage from one street and exits to a different street, a new start point has to be determined using the method described above.

Generally, the geographical positions computed by an in-vehicle device 21 do not coincide with nodes. In a digitized road network map, there are only two classes of elements, the links and the nodes, and the information associated with each node is more important and useful. An adjustment is required to ensure that traffic information related to each node is collected. An example is illustrated in FIG. 8. Vehicle locations C5 to C9 are dynamically acquired geographical positions that have been correctly located on the links 16. A distance between each of the positions C5 to C9 and the sink node N3 of the link is compared with a predetermined distance d2. A position remains on the link 16 in its original location if the distance between the position and the node is greater than the predetermined distance d2. Positions C5 to C8 therefore remain unchanged. A position is moved to the sink node, however, if the distance between the position and the sink node is less than the predetermined distance d2. The position C9 is therefore moved to node N3. Consequently, the position information related to C9 is now associated with node N3. In general, if a proper data collection interval is adopted and the distance d2 is correctly selected, more than one geographical position should be located on each link and most nodes on the links should be associated with traffic data after adjustments are completed.

Figure 9:
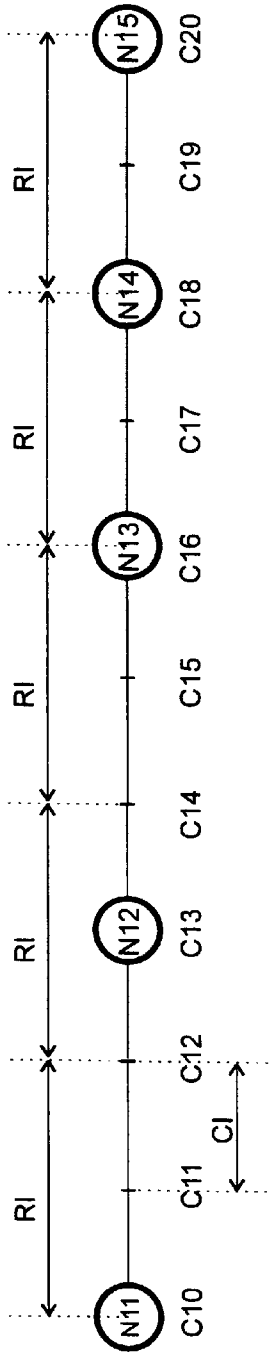
FIG. 9 is a schematic diagram illustrating a data collection and reporting sequence using a system in accordance with the invention.

The data respecting the vehicle's positions is not reported to the traffic service center 60 at each position determination. Rather, it is temporarily stored by the computer system 26 of the in-vehicle device 21 and transmitted in batches. A time interval CI, preferably in seconds, known as a Collection Interval and a time interval RI, also preferably in seconds, known as a Reporting Interval are preassigned. An example of a traffic data collection and reporting sequence is illustrated in FIG. 9. Within a period of time, the dynamically acquired positions of a vehicle 20 located on the digitized road network map 13 are represented as points C10 to C20, and the time interval from one position to an adjacent one is CI. CI is a predetermined constant time interval for collecting the geographical position status. The distance between two adjacent positions may not be constant because the travel speed of the vehicle may change. The predetermined time interval RI for reporting the dynamic position data to the traffic service center 60 is preferably twice CI. Therefore, the vehicle reports a batch position data after every second data collection. The period RI may be longer, five times the length of period CI for example, in which case the report includes more position data so that the transmission of data from the vehicle 20 to the traffic service center.60 is more efficient. Furthermore, for a digitized road network map, only the information associated with nodes is really important. Consequently, position data reported by each vehicle 20 to the traffic service center 60 may only include the position data associated with nodes 14. In the example shown in FIG. 9, the data associated with positions C10, C13, C16, C18 and C20, respectively associated with nodes N11–N15, are reported while the data associated with positions C11, C12, C14, C15, C17 and C19 are not reported. Consequently, the volume of data transmitted is reduced and the computational processing of the service center 60 is likewise reduced.

The traffic forecaster 68 of the traffic service center 60 uses a simple calculation to compute the travel time of a vehicle for a specific link or the vehicle travel speed on the link. The traffic forecaster 68 retrieves traffic data for two adjacent nodes from the database 66, and determines a time at which the vehicle was on the source node of the link and a time the vehicle was on the sink node of the link. The travel time of the vehicle for the link is determined by calculating a difference between the two times. The travel speed for the link is determined by dividing a length of the link by the travel time. The data including the travel time, or vehicle travel speed for each link are computed from time to time from each vehicle 20 to provide a database for forecasting traffic conditions for the roadway system 10.

The traffic forecasts are based on the fact that under normal conditions, road traffic varies with time during a day and with the days of a week, but it does not change much from one week to the next. Of course, traffic accidents, bad weather, road constructions, holidays or special public activities have a less predictable effect. Therefore, an average traffic condition for a specific link or route which is formed by continuous links, at a given time on a given day of a week may be used as a basis for prediction respecting the link or route under normal conditions at the same time on the same day of another week. Furthermore, the prediction may be modified by special factors associated with abnormal conditions, at the time a real-time traffic forecast is made. The method for forecasting the travel time for a link or a route at a given time t on a given day D of a week is described below by way of the following example.

The traffic forecaster 68 retrieves vehicle locations from the database 66 and computes link travel times of the vehicles. Each day is divided into a predetermined number of equal time intervals referred to as Forecast Intervals (FI); for example, FI=5 minutes. An FI is selected that includes the given time t, for example, the FI from 3:00pm to 3:05pm includes the given time of 3:00pm of a given day, for example, Monday. A set of travel time samples for a link L at the FI from 3:00pm to 3:05pm on Monday is selected and an average travel time for the link L within the FI from 3:00pm to 3:05pm on Monday is determined by summing up all travel times of the samples and dividing by the number of samples. This is the predicted travel time for the link L at time 3:00pm on a future Monday to be forecasted. The week in which the traffic data is collected and processed in the above-described method for predicting the traffic conditions is referred to as an "historic period ".

However, because of abnormal conditions which may occur in the historic period, the average travel time for the link at the time may not accurately represent normal traffic conditions. For example, if a traffic accident occurs on the link L at 2:45pm on Monday and the traffic on the link L between 3:00pm and 3:05pm is affected, the average travel time for the link L within that time interval will not represent normal traffic conditions. To minimize the effect of an abnormal condition on a traffic forecast, an historic period longer than one day of one week is recommended. For example, an historic period of eight weeks may be used for greater accuracy. If so, eight average travel times are determined for the link L at the time of 3:00pm on eight previous Mondays. The predicted travel time for the link L at time 3:00pm on Monday is determined by averaging the eight average travel times for the link. Regardless of the length of the historic period selected, the data used for traffic predictions is continuously updated so that only data related to immediately past periods is used in a traffic forecast.

A weighted average method is also suggested for forecasting link travel time. For example, if an historic period of eight weeks is used to forecast a link travel time, a series of decreasing weighting factors may be used to weight the forecast so that the travel times for more recent weeks affect the forecast more than travel times from weeks further in the past. Different weighting methods well known in the art can be used for the forecasts under different conditions and in different situations.

Real-time abnormal traffic conditions may be weighted in a plurality of ways. A closed road segment, for example, may be assigned a weight factor of 1000, the weight factor being used to calculate a predicted link travel time. Therefore, a subsequent broadcast will show that link travel time is 1000 times greater than a normal travel time and the road explorers 34 or drivers will realize the link is impossible. A weight factor of 5, as a further example, may be used to adjust a travel time for links which are in regions experiencing heavy snow. A database is preferably established for storing weighting factors associated with abnormal traffic and inclement weather conditions.

The current traffic conditions may also affect traffic forecasts. If there is congestion on a link which is not normally congested and the congestion is completely due to traffic volume, the traffic service center receives a plurality of traffic data indicating that the link is experiencing an unusual congestion, by comparing the current traffic status with the normal traffic condition. This unusual congestion is also used to adjust the next traffic forecast.

An average travel time for a route R which consists of a series of continuous links L1 to Ln, given a departure at a time t on a given day D of the week, is computed by the road explorer 34. The travel time is computed as a sum of an average travel time T1 for link L1 at the time t, average travel time T2 for link L2 at time (t+T1) . . . , and average travel time TN for link Ln at a time (t+T1+T2+. . . +Tn−1). If the route R further includes some critical left-turns where waiting times cannot be ignored, then left-turn time is also added to the travel time for route R in the same way as described above. It should be noted that this calculation is performed by the road explorer 34 of the in-vehicle device 21 rather than the traffic forecaster 68 of the traffic service center 60. The computational load of the traffic forecaster 68 is therefore shared by the plurality of the in-vehicle devices 21.

In order to efficiently broadcast travel time forecasts from the traffic service center 60, a time interval referred to as a Network Broadcasting Interval (NBI) is selected, and the digitized road network map 13 is broadcast at every NBI. Further, the digitized road network map is divided into smaller blocks. The division may be based on post code zones, or arbitrary street zones. The use of these smaller blocks is to reduce data volume to be stored in in-vehicle devices. The contents of this broadcast include: node information including a node index, the latitude and longitude of the node, a block number to identify where the node is located, etc.; link information including a link index, a block number for identifying where each link is located, a source node and a sink node of the link, etc.; and left-turn information including a left-turn index, and incoming and outgoing links for each turn. The NBI preferably has a duration of an integer number of minutes. Another time interval, referred to as a Traffic Broadcasting Interval (TBI) determines the frequency with which an average travel time forecast is broadcast. This forecast is done in real-time and the contents of this broadcast include: current time; a block index; link traffic information that includes a link index, forecast travel times for a next predetermined period of time, FI by FI; left-turn traffic information that includes a left-turn index. The TBI is preferably a fairly short interval, five minutes for example.

The digitized road network map broadcast from the traffic service center is received by the in-vehicle device 21 and is stored by the computer system 26. The current vehicle's position is located on the digitized road network map 13 using the method described above and the block in which the vehicle is currently located is determined. A destination for the trip may be entered by a driver using the driver interface 28. The locator 32 executes a program to find a block chain that starts from the block where the vehicle is currently located, and ends at a block in which the destination is located. These chained blocks are flagged. The travel time forecast is received from the traffic service center and traffic data relating to the flagged blocks is stored by the computer system 26. Traffic forecast data not related to the flagged blocks is discarded. If the route or destination is changed by the driver, the chained block list is re-computed and traffic forecast information for any newly flagged blocks is screened from a traffic forecast at the next TBI.

In the case where the driver does not enter a destination for the trip, or where the driver has no clear, determined destination, the locator 32 uses a configurable radius, and a circle centered at the current vehicle's position is made with the given radius. Blocks within or partly within the circle are flagged.

The embodiments of the invention described above are intended to be exemplary only. Given the basic principles of the invention, changes and modifications will no doubt become apparent to persons of skill in the art. The scope of the invention is therefore intended to be limited solely by the scope of the appended claims.

What is claimed is:

1. A method for forecasting road traffic comprising the steps of:

(a) periodically collecting vehicle position data at a traffic service center, the vehicle position data being dynamically reported by equipped vehicles travelling roads in a given area, the equipped vehicles being adapted to receive geographical position data into relative vehicle position data to determine a position of the vehicle with respect to a digitized road network of nodes interconnected by straight links, the links indicating traffic directions between the nodes, the vehicle position data reported including only data related to the nodes, the geographical position data being received and converted into a relative position on the digitized road network at a predetermined collection interval (CI) and the vehicle position data being reported at a predetermined reporting interval (RI), wherein RI>CI;

(b) computing at the traffic service center using the vehicle position data real travel time of vehicles travelling the links;

(c) accounting at the traffic service center a set of real travel time samples for a link L1 from real travel times related to a given time interval starting at or including a time t on a given day D of a week; and (d) calculating at the traffic service center an average travel time T1 for the link L1 using the set of real travel time samples at a time t on the day D, and storing the average travel time T1 for use in predicting a travel time for the link L1.

2. A method as claimed in claim 1 further comprising the steps of:

(e) repeating steps (c) and (d) to calculate an average travel time T2 for a link L2 at a time (t+T1), an average travel time T3 for a link L3 at a time (t+T1+T2) sequentially up to an average travel time Tn for a link Ln at a time (t+T1+T2+ . . . +Tn−1); and (f) calculating an average travel time $T_R$ for a route R including continuous links L1, L2, L3, . . . and Ln at the departure time t by summing the average travel times T1, T2, T3, . . . and Tn for predicting a travel time for route R at the departure time t on the day D.

3. A method as claimed in claim 2 wherein the route R including critical left-turns and left-turn waiting time is added to the travel time of route R.

4. A method as claimed in claim 2 wherein the predicted travel time T1 for the link L1 at the time t on the day D is forecasted by:

(a) repeating steps (c) and (d) to calculate travel times Tw1, Tw2, . . . and Twm for the link L1 at the given time t on the given day D of weeks w1, w2, . . . wm; and (b) averaging Tw1, Tw2, . . . Twm to determine T1.

5. A method as claimed in claim 4 wherein a weighted average method is used for averaging Tw1, Tw2, . . . Twm.

6. A method as claimed in claim 5 wherein the day D is in a week immediately following week Tw1, where Tw1 is the most recent week and a series of decreasing weighting factors are applied in the weighted average method, so that the travel times for more recent weeks affect the forecast more than travel times for weeks further in the past.

7. A method as claimed in claim 2 wherein the average travel time for route R at the departure time t on the given day D of the week is converted to an average travel speed on the route R.

8. A method as claimed in claim 1 wherein the given time interval in step (c) is selected from time intervals which are predetermined equal intervals of the day D.

9. A method as claimed in claim 1 wherein the average travel time T1 for the link L1 at the time t on the given day D of the week w is converted to an average travel speed on link L1.

10. A method as claimed in claim 1 wherein the predicted travel time is multiplied by a predetermined weighting factor associated with road or weather conditions to adjust the predicted travel time for link L1 at the time t on the day D when the road or weather conditions are abnormal, and/or adjusted by current unusual congestion.

11. A method as claimed in claim 1 wherein the reporting interval RI is an integer multiple of the collection interval CI.

12. A method as claimed in claim 1 wherein the digitized road network is broadcast from the traffic service center to the vehicles via a radio frequency broadcast of digital data, and the broadcast is received by radio frequency receivers in the equipped vehicles.

13. A method as claimed in claim 12 wherein the radio frequency broadcast of digital data is performed at predetermined time intervals and includes node information, link information and left-turn information.

14. A method as claimed in claim 12 wherein a one-way road in the digitized road network is represented by a continuous series of the links oriented in a traffic direction and a two-way road in the digitized road network is represented by a continuous series of pairs of oppositely oriented, parallel links, each pair of links connecting two adjacent nodes.

15. A method as claimed in claim 1 wherein a reference system for the digitized road network is the same as a reference system used by the global positioning system.

16. A method as claimed in claim 1 wherein each of the links is referenced by computing an angle of rotation from a source node of the link with respect to an imaginary link oriented due east from the source node, the slope angle being represented as a positive angle if the link is in an upper quadrant with respect to the imaginary link and as a negative angle if the position link is in a lower quadrant with respect to the imaginary link, the slope angle of the link being in a range of 0° to ±180°.

17. A method as claimed in claim 16 wherein a position of each of the vehicles on the digitized road network is computed by performing steps of:

(a) receiving at the vehicle current global positioning information from a plurality of satellites of the global positioning system;

(b) locating a geographical position of the vehicle on the digitized road network using the global positioning information;

(c) locating on the digitized road network a last node passed by the vehicle and computing a distance between the geographical position and the last node passed;

(d) creating a position link between the last node passed and the geographical position of the vehicle on the digitized road network;

(e) determining a slope angle of the position link by computing an angle of rotation between the position link and an imaginary link oriented towards due east from the last node passed;

(f) comparing the slope angle of the position link with a slope angle of each link emanating from the last node passed, and selecting a link having a slope angle with an absolute value nearest an absolute value of the slope angle of the position link; and (g) relocating the geographical position of the vehicle to the selected link at a distance from the last node passed equal to a distance between the geographical position and the last node passed.

18. A method as claimed in claim 17 wherein a start point of an equipped vehicle begiining a trip is located by the steps of:

(a) receiving current global positioning information at the equipped vehicle from the global positioning system;

(b) computing a current geographical position of the quipped vehicle and locating the position on the digitized road network as the start point;

(c) selecting a node on the digitized road network that is closest to the start point; and (d) moving the start point to the selected node which thereafter serves as the last node passed for locating a next vehicle position on the digitized road network.

19. A method as claimed in claim 18 wherein the start point of the vehicle is located by performing the following steps between the steps (c) and (d):

(1) comparing a distance between the current geographical position of the equipped vehicle and the selected node to a predetermined distance; and (2) repeating steps (a) to (c) if the distance between the current geographical position and the selected node is greater than the predetermined distance, until a distance between the current geographical position and a selected node is smaller than the predetermined distance, and moving the start point to the selected node.

20. A method as claimed in claim 17 wherein the geographical position of the vehicle on the digitized road network is computed by performing further steps of:

comparing a distance between the current geographical position of the equipped vehicle and a last known node with a length of the selected link; and moving the current geographical position on the selected link to a sink node of the selected link if a difference between a length of the selected link and the distance is smaller than a predetermined distance, or retaining the current geographical position on the link if the difference is greater than the predetermined distance.

21. A remote traffic data collection and intelligent vehicle highway system for a highway vehicle, comprising:

a traffic service center adapted to receive and process vehicle position data to determine an average travel time or travel speed for any specific link during a given forecast interval on a given day of a week, and broadcast a digitized road network consisting of nodes interconnected by straight links representing road segments, the links indicating traffic direction between the nodes, and to concurrently, or independently broadcast a forecast of an average travel time or travel speed for the specific link during the given forecast interval on the given day in the future;

a remote traffic data collection sub-system including in-vehicle devices in a plurality of vehicles, each of the devices being adapted to receive, from time to time, global positioning information from a Global Positioning System (GPS) and to convert the global positioning information into the vehicle position data associated with at least some of the nodes on the digitized road network, the global positioning information being received and converted into the vehicle position data at a predetermined collection interval (CI); and a communication sub-system in each device and the traffic service center for communicating the vehicle position data from the vehicle to the traffic service center, and the digitized road network and the road traffic forecast from the traffic service center to the vehicle, the vehicle position data being reported to the traffic service center at a predetermined reporting interval (RI), wherein RI>CI.

22. A system as claimed in claim 21 wherein the traffic service center comprises:

a highway vehicle database for storing the vehicle position data received from equipped vehicles travelling roads in a service area;

a traffic forecaster program for processing the vehicle position data and to derive an average travel time T1 for a link L1 during a given forecast interval (FI);

a server for executing the traffic forecaster program and storing the digitized road network; and a data exchange interface for connecting the server to a communication sub-system which transmits the traffic forecast data respecting average travel times for links and receives the vehicle data dynamically reported from each of the equipped vehicles travelling roads in the service area.

23. A system as claimed in claim 22 wherein the traffic service center comprises an external party interface adapted to connect to external parties for road and weather information, and an external party integrator adapted to integrate the road and weather information with the traffic forecast data.

24. A system as claimed in claim 21 wherein each of the in-vehicle devices comprises:

a global positioning system receiver for receiving global positioning information from satellites of the global positioning system;

a mobile radio sub-system adapted to transmit vehicle location data to the traffic service center and receive traffic forecast data from the traffic service center;

a driver interface to permit a driver of the vehicle to interact with the in-vehicle device;

an emergency reporting mechanism; and a vehicle support system including:

a computer system for executing a vehicle position locator program, storing the digitized road network received from the traffic service center and other data, as required, and the vehicle position locator program for determining a location of the vehicle on the digitized road network using the global positioning information.

25. A system as claimed in claim 24 wherein the vehicle support system further comprises a road explorer program executed by the computer system, adapted to provide route information using the traffic forecast data.

26. A system as claimed in claim 25 wherein the driver interface includes a data entry mechanism adapted to enable the driver to enter a destination point, and a display mechanism for displaying a recommended travel route between a departure point and the destination point.

27. A system as claimed in claim 26 wherein the road explorer computes a predicted travel time for a route using predicted travel times for links which form the route.

28. A method for locating positions of an equipped vehicle travelling roads represented by a digitized road network using geographical positions dynamically collected by the equipped vehicle, comprising:

retrieving a digitized road network from a traffic service center, the digitized road network being organized in road segments, wherein each road segment is a link represented by a straight line that extends from a source node to an adjacent sink node, the line indicating a traffic direction supported by the link, each one-way road in the digitized road network being represented by a continuous series of links, and each two-way road in the digitized road network being represented by a continuous series of pairs of oppositely indicated, parallel links, each pair connecting two adjacent nodes;

locating one of the geographical positions of the vehicle on the digitized road network; and if the geographical position of the vehicle is not coincident with a link, moving the geographical position of the vehicle to a nearest link associated with a node which the vehicle last passed, while maintaining a same distance between the moved geographical position and the last node which the vehicle last passed as a distance between the geographical position and that node before the geographical position was moved.

29. A method as claimed in claim 28 wherein the nearest link associated with the node which the vehicle last passed is determined by:

retrieving or determining a slope angle of each link that emanates from the last node passed, the respective slope angles being determined by computing an angle of rotation between each link and an imaginary link oriented due east from the node, the slope angle being represented as a positive angle if the link is in an upper quadrant with respect to the imaginary link and as a negative angle if the link is in a lower quadrant with respect to the imaginary link, the slope angle of the link being an angle between 0° and ±180°;

creating a position link from the node last passed by the vehicle and the geographical position of the vehicle on the digitized road network;

determining a slope angle of the position link by computing an angle of rotation between the position link and the imaginary link;

comparing the slope angle of the position link with the respective slope angles of each link emanating from the node respectively, and selecting one of the links having a slope angle with an absolute value closest to an absolute value of the slope angle of the position link.

30. A method as claimed in claim 28 further comprising steps of:

receiving current global positioning information at the equipped vehicle from time to time from a global positioning system;

repeating the steps for locating an equipped vehicle position on the digitized road network until the position of the equipped vehicle is located on the digitized road network.

31. A method as claimed in claim 28 wherein a start node for the equipped vehicle is located by steps of:

(a) receiving current global positioning data at the equipped vehicle from the global positioning system;

(b) computing the current geographical position of the equipped vehicle and locating the geographical position on the digitized road network as a start point;

(c) selecting a node on the digitized road network that is closest to the start point; and (d) moving the start point to the selected node, whereby the node series as a node last passed by the equipped vehicle for locating a following vehicle position on the digitized road network.

32. A method as claimed in claim 31 wherein the start node of the vehicle is located by performing further steps between the steps (c) and (d), the further steps comprising:

(1) comparing a distance between the start point and the selected node with a predetermined distance; and (2) repeating Steps (a) to (c) if the distance between the start point and the selected node is greater than the predetermined distance, until a distance between the start point and the selected node is less than the predetermined distance.

33. A method as claimed in claim 28 wherein the equipped vehicle is located on the digitized road network by further steps of:

comparing a length of the position link with a length of the selected link; and further moving the geographical position on the selected link to the sink node of the selected link if the difference in length between the selected link and the position link is less than a predetermined distance, and retaining the geographical position on the link if the difference is greater than the predetermined distance.

* * * * *

UNITED STATES PATENT AND TRADEMARK OFFICE

CERTIFICATE OF CORRECTION

PATENT NO. : 6,401,027 B1
APPLICATION NO. : 09/317127
DATED : June 4, 2002
INVENTOR(S) : Yiwen Xu It is certified that error appears in the above-identified patent and that said Letters Patent is hereby corrected as shown below:

1. Column 14, line 18, after “the equipped vehicles being adapted to receive” insert --geographical positional data from a global positioning system and to convert the--.

Signed and Sealed this

Eleventh Day of March, 2008

JON W. DUDAS
*Director of the United States Patent and Trademark Office*